(12) United States Patent
Krasowski

(10) Patent No.: US 9,872,293 B1
(45) Date of Patent: Jan. 16, 2018

(54) INTELLIGENT DATA TRANSFER FOR MULTIPLE SENSOR NETWORKS OVER A BROAD TEMPERATURE RANGE

(71) Applicant: The United States of America as represented by the Administrator of the National Aeronautics and Space Administration, Washington, DC (US)

(72) Inventor: Michael Krasowski, Chagrin Falls, OH (US)

(73) Assignee: The United States of America as Represented by the Administrator of National Aeronautics and Space Administration, Washington, DC (US)

( * ) Notice: Subject to any disclaimer, the term of this patent is extended or adjusted under 35 U.S.C. 154(b) by 152 days.

(21) Appl. No.: 14/548,939

(22) Filed: Nov. 20, 2014

Related U.S. Application Data

(60) Provisional application No. 61/907,567, filed on Nov. 22, 2013.

(51) Int. Cl.
*H04J 9/00* (2006.01)
*H04W 72/04* (2009.01)
*H04W 84/18* (2009.01)

(52) U.S. Cl.
CPC ........ *H04W 72/0453* (2013.01); *H04W 84/18* (2013.01)

(58) Field of Classification Search
CPC ........................... H04W 72/0453; H04W 84/18
See application file for complete search history.

(56) References Cited

U.S. PATENT DOCUMENTS

| | | | | |
|---|---|---|---|---|
| 5,645,059 A * | 7/1997 | Fein | ..................... | A61B 5/0002 356/41 |
| 5,924,055 A * | 7/1999 | Hattori | ................ | B60C 23/0401 340/447 |
| 6,392,562 B1 * | 5/2002 | Boston | ............... | G01N 15/0656 324/204 |
| 6,512,555 B1 * | 1/2003 | Patel | ....................... | H03D 1/24 348/500 |
| 6,568,629 B1 * | 5/2003 | Perrin | ....................... | F41G 7/28 244/3.11 |
| 6,587,037 B1 * | 7/2003 | Besser | ................... | E21B 43/128 340/538.11 |
| 6,608,566 B1 * | 8/2003 | Davis | ....................... | G01H 1/00 340/870.11 |
| 2002/0049389 A1 * | 4/2002 | Abreu | .................. | A61B 3/1241 600/558 |
| 2002/0198470 A1 * | 12/2002 | Imran | .................. | A61M 31/002 600/587 |
| 2003/0046566 A1 * | 3/2003 | Holopainen | .......... | G06F 21/125 713/193 |
| 2004/0099321 A1 * | 5/2004 | Schoeniger | ............... | F15C 5/00 137/828 |
| 2005/0001742 A1 * | 1/2005 | Small | ....................... | G01S 1/24 340/988 |

(Continued)

*Primary Examiner* — Clemence Han
(74) *Attorney, Agent, or Firm* — Robert H. Earp, III

(57) ABSTRACT

A sensor network may be configured to operate in extreme temperature environments. A sensor may be configured to generate a frequency carrier, and transmit the frequency carrier to a node. The node may be configured to amplitude modulate the frequency carrier, and transmit the amplitude modulated frequency carrier to a receiver.

17 Claims, 3 Drawing Sheets

(56) References Cited

U.S. PATENT DOCUMENTS

| | | | |
|---|---|---|---|
| 2005/0103988 A1* | 5/2005 | Wang | G01L 1/243 250/227.14 |
| 2006/0202774 A1* | 9/2006 | Hirano | H03C 3/0925 332/144 |
| 2008/0260165 A1* | 10/2008 | Saito | H04H 20/48 381/3 |
| 2009/0204354 A1* | 8/2009 | Davis | H04W 84/18 702/89 |
| 2009/0302870 A1* | 12/2009 | Paterson | G01N 27/223 324/670 |
| 2013/0056155 A1* | 3/2013 | Scullin | H01J 37/32082 156/345.28 |
| 2013/0136152 A1* | 5/2013 | Draeger | G01K 1/024 374/183 |
| 2013/0314317 A1* | 11/2013 | Wu | G06F 3/017 345/158 |
| 2014/0219841 A1* | 8/2014 | Kozaki | F04D 19/042 417/423.12 |
| 2015/0003206 A1* | 1/2015 | Inada | G01S 5/186 367/99 |
| 2015/0003422 A1* | 1/2015 | Jin | H04W 74/06 370/335 |
| 2015/0049791 A1* | 2/2015 | Di Grazia | G01S 19/24 375/149 |
| 2015/0050170 A1* | 2/2015 | Kozaki | F16C 32/0489 417/423.12 |

\* cited by examiner

INTELLIGENT DATA TRANSFER FOR MULTIPLE SENSOR NETWORKS OVER A BROAD TEMPERATURE RANGE

CROSS REFERENCE TO RELATED APPLICATION

This application is a non-provisional of, and claims priority to, U.S. Provisional Patent Application Ser. No. 61/907,567, filed Nov. 22, 2013. The subject matter of this earlier-filed application is hereby incorporated by reference in its entirety.

ORIGIN OF THE INVENTION

The invention described herein was made by employees of the United States Government and may be manufactured and used by or for the Government for Government purposes without the payment of any royalties thereon or therefore.

FIELD

The present invention generally pertains to sensors, and more particularly, to operating multiple sensor networks for intelligent data transfer over a broad temperature range.

BACKGROUND

At extreme temperatures, e.g., cold cryogenic temperatures and hot temperatures of over 300° C., few components are available to support intelligent data transfer over a common, linear combining medium. The instrumentation for processes operating at these temperatures may be located remotely. For example, silicon carbide (SiC) digital and analog circuits have been demonstrated to operate over a broad temperature range of between negative 125° C. to over 500° C. However stable time bases that are typically necessary for setting the operating frequencies needed for synchronization or detection of intelligent data transfer do not exist.

For example, in the area of distributed jet engine control (DEC), the intention is to network together sensors for control of jet engines. The processing and distributing of the data needs to be remote from the sensor in a cooler part of the engine. This may require wires from each sensor to thread back to the cooler part of the engine. This approach, however, increases the mass of the wires to the engine. Thus, an alternative approach may be beneficial.

SUMMARY

Certain embodiments of the present invention may be implemented and provide solutions to the problems and needs in the art that have not yet been fully solved by conventional sensor network technologies. For example, some embodiments pertain to intelligent data transfer in environments with extreme temperatures.

In one embodiment, an apparatus includes at least one sensor and at least one node. The at least one sensor is configured to generate a frequency carrier. The at least one node is configured to amplitude modulate the frequency carrier, and transmit the amplitude modulated frequency carrier to a receiver.

In another embodiment, an apparatus includes an amplitude modulator configured to amplify a frequency carrier by an output of a code sequence, allowing a sensor to operate in extreme temperature environments.

In yet another embodiment, an apparatus includes a code sequence generator configured to output a code sequence (or waveform) unique to the apparatus, allowing multitudes of like apparatuses to operate simultaneously, each being uniquely recognizable by a receiver.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

A smart sensor node system operable over extreme temperatures can be developed from microprocessors with high processing speeds. There is a desire for multiple node sensing and instrumentation systems for use in high temperature environments, such as the surface of Venus and within jet engines. In extreme temperatures, microprocessors and memory cannot be embedded to enable intelligent data transfer protocols because the level of integration is not only impractical, but also impossible with present day silicon carbide (SiC) technology. However, SiC integrated circuits have shown endurance at temperatures exceeding 500° C. and, therefore, may be configured to be used for intelligent data transfer under these conditions.

Figure 1:
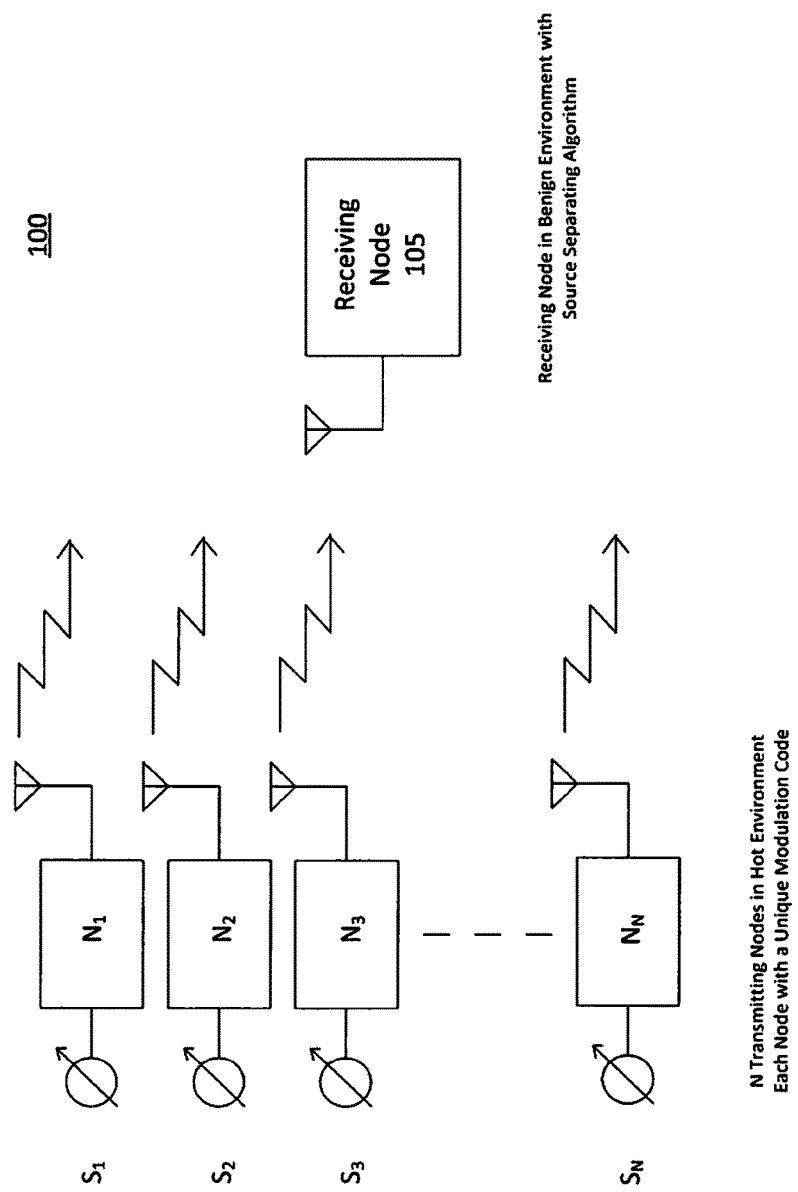
FIG. 1 is a block diagram illustrating a smart sensor network assembly, according to an embodiment of the present invention.

FIG. 1 is a block diagram illustrating a smart sensor network system 100, according to an embodiment of the present invention. In FIG. 1, a plurality of sensors $S_1 \ldots S_N$ are connected to corresponding nodes $N_1 \ldots N_N$. Each node $N_1 \ldots N_N$ may include a prescaler, a code generator, and an amplitude modulator, as shown in FIG. 2, for example.

In this embodiment, when sensor $S_1$, for example, generates a frequency carrier, node $N_1$ receives the frequency carrier and amplitude modulates the frequency carrier to uniquely associate the frequency carrier with sensor $S_1$ or node $N_1$. A similar process may be carried out for sensors $S_2 \ldots S_N$ and nodes $N_2 \ldots N_N$.

The modulated frequency carrier may then be transmitted to a receiving node (or receiver) 105. Receiving node 105 may be in a benign environment, such as a cooler part of an aircraft, a ground station, a satellite, etc., with a source separation algorithm. For example, the source separation algorithm may include a linear source separation algorithm. Linear source separation is the detection and division of multiple signals, which have been combined into a single signal on a linearly combining medium. The objective is to recover the original signals from the combined signal. This operation may be accomplished in numerous ways, including Fourier techniques, both analog and digital tunable radio, discrete linear algebra operations, etc. If each signal source includes a unique characteristic differentiating it from the others signal sources, and if the unique characteristic is known and recognizable, then the recovery operation for that signal from the mix can be facilitated. Each node $N_2 \ldots N_N$ may simultaneously transmit their own individual signals combined into a single signal on the linearly combining medium of the ether. The unique modulation envelope associated with each node facilitates its recognition by a source separation operation. It should be appreciated that any source separation algorithm may be used that would be appreciated by a person of ordinary skill in the art.

Figure 2:
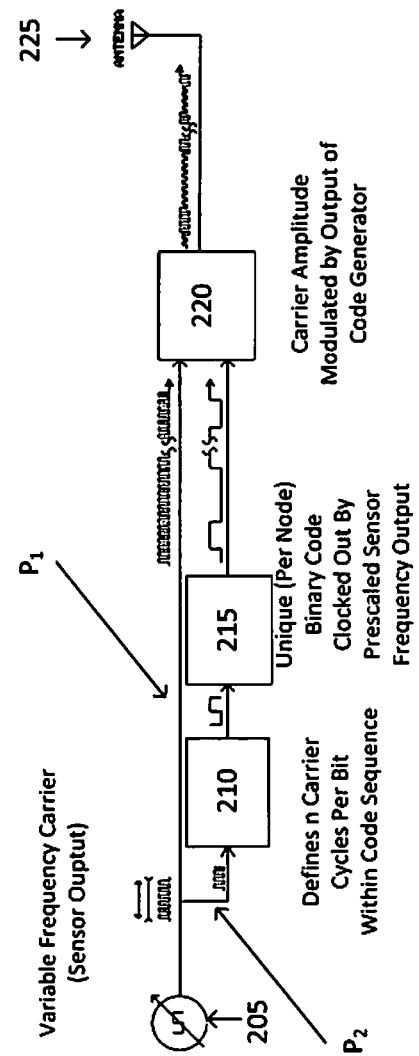
FIG. 2 is a block diagram illustrating a smart sensor network, according to an embodiment of the present invention.

FIG. 2 is a block diagram illustrating a smart sensor network 200, according to an embodiment of the present invention. In this embodiment, sensor 205 may be a ring oscillator, an accelerometer, a reactor, or any other sensed-variable to frequency generator. Also, in this embodiment, sensor 205 generates a sensor output. The sensor output may be an output frequency to vary about a center frequency, i.e., a variable frequency carrier. The variable frequency carrier is transmitted to an amplitude modulator 220 along a first path $P_1$.

Simultaneously or shortly thereafter, the variable frequency carrier, through a separate path $P_2$, is also transmitted to a prescaler 210. Prescaler 210 may divide the variable frequency carrier by an n integer number per bit. The n integer number may be a predefined number, a random number, a number based on receiver characteristics, or any number that would be appreciated by a person of ordinary skill in the art. Stated differently, prescaler 210 may define n carrier cycles per bit within a code sequence.

Code generator 215 may generate a code sequence (e.g., a unique waveform) using the divided variable frequency carrier. In this embodiment, the code sequence is periodic, since the code sequence repeats itself. The code sequence may include binary numbers, pseudo-random binary sequences, American Standard Code for Information Interchange (ASCII) characters, Gold codes, or any type of identifier that would be appreciated by a person of ordinary skill in the art. Stated differently, code generator 215 assigns a code that uniquely associates the variable frequency carrier with sensor 205 or the node. This way, the receiver may identify sensor or node from the variable frequency carrier using the uniquely associated code sequence.

The code sequence is transmitted to amplitude modulator 220. Amplitude modulator 220 may amplitude modulate the variable frequency carrier by the code sequence, and may transmit the modulated variable frequency carrier to a receiver via antenna 225. Stated differently, the modulated variable frequency carrier includes the same frequency as the variable frequency carrier. However, the amplitude of the modulated variable frequency carrier shifts as a function of the code sequence, allowing the receiver to identify sensor 205.

Figure 3:
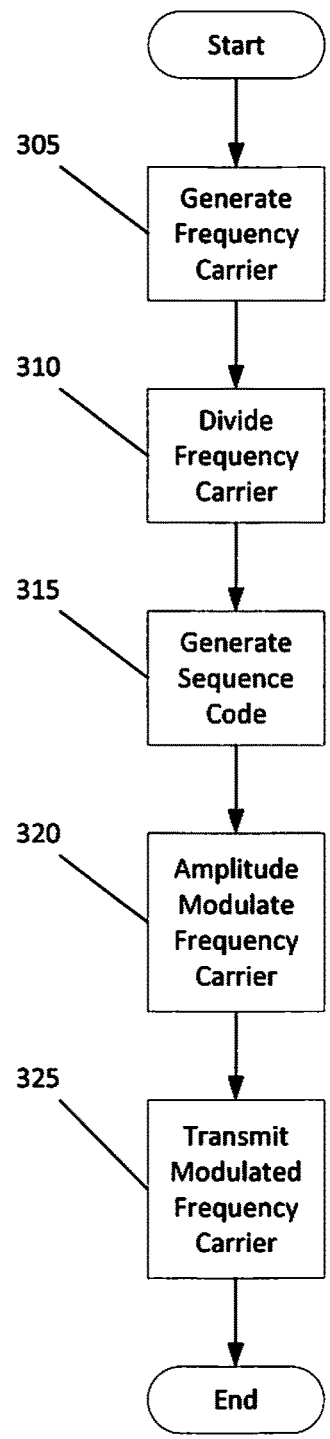
FIG. 3 is a flow diagram illustrating a process for amplitude modulating a frequency carrier, according to an embodiment of the present invention.

FIG. 3 is a flow diagram 300 illustrating a process for amplitude modulating a frequency carrier, according to an embodiment of the present invention. In this embodiment, the process begins at 305 with the sensor generating a frequency carrier. The frequency carrier is transmitted to the amplitude modulator through a first path.

At 310, a prescaler divides the frequency carrier by an n integer number, and at 315, a code generator generates a code sequence from the divided frequency carrier. At 320, an amplitude modulator amplifies or modulates the frequency carrier with the code sequence. At 325, the modulated frequency carrier is transmitted to a receiver.

One or more embodiments described herein relate to identifying data outputted from a sensor in extreme temperature environments. For example, outputs from sensors (or oscillators) may be superimposed onto a single medium. This medium may include a power line supplying current to the sensors, a third wire dedicated to data transmission, airwaves through radio transmissions, an optical medium, etc. Using frequency dividers and linear feedback shift registers, which include flip flops and combinatorial logic gates connected to each oscillator, unique bit stream codes may be generated. These unique codes are used to amplitude modulate the output of the sensor, i.e., to the outputted frequency. By using a dividend of the oscillator frequency to generate the code, a constant, a priori number of oscillator cycles will define each bit.

At the receiver, the detected frequency may include a unique code. This way, the detected frequency will be disassociated from noise and from other transmitting sensors such that the detected frequency has a unique modulation pattern or voice. As a result, intelligent data transfer can be accomplished in extreme temperature environments such as Venus, power engines, energy extraction devices, etc.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that embodiments of the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An apparatus, comprising:
   at least one sensor configured to generate a frequency carrier; and
   at least one node configured to amplitude modulate the frequency carrier, and transmit the amplitude modulated frequency carrier to a receiver.

2. The apparatus of claim 1, wherein the at least one sensor is further configured to transmit the frequency carrier to the node.

3. The apparatus of claim 2, wherein the node comprises a prescaler configured to divide the frequency carrier by an n integer number per bit.

4. The apparatus of claim 3, wherein the node further comprises a code generator configured to generate a code sequence from the divided frequency carrier.

5. The apparatus of claim 4, wherein the code sequence is uniquely associated with the node of the sensor.

6. The apparatus of claim 4, wherein the node further comprises an amplitude modulator configured to amplitude modulate the frequency carrier with the code sequence.

7. The apparatus of claim 6, wherein the amplitude modulated frequency carrier comprises an amplitude of the modulated frequency carrier shifting as a function of the code sequence to allow the receiver to identify the sensor.

8. An apparatus, comprising:
   an amplitude modulator configured to amplify a frequency carrier by an output of a code sequence, wherein a sensor is configured to operate in cold cryogenic temperatures and temperatures over 300° C.

9. The apparatus of claim 8, wherein the amplitude modulator is further configured to receive the frequency carrier from the sensor through a first path.

10. The apparatus of claim 8, wherein the amplitude modulator is further configured to receive the code sequence from a code generator through a second path.

11. The apparatus of claim 8, further comprising:
    a code generator configured to generate the code sequence uniquely associated with a node.

12. The apparatus of claim 8, further comprising:
    a prescaler configured to divide the frequency carrier by an n integer number per bit.

13. An apparatus, comprising:
    a code sequence generator configured to output a code sequence unique to the apparatus, allowing for a plurality of apparatuses to operate simultaneously, each of the plurality of apparatuses being uniquely recognized by one or more receivers.

14. The apparatus of claim 13, wherein the apparatus comprises a node.

15. The apparatus of claim 14, wherein the node is configured to receive a frequency carrier generated from a sensor.

16. The apparatus of claim 13, further comprising:
    a prescaler configured to divide a frequency carrier by an n integer number per bit.

17. The apparatus of claim 13, further comprising:
    an amplitude modulator configured to modulate an amplitude of a frequency carrier with the code sequence, and transmit the modulated frequency carrier comprising the code sequence to said one or more receivers.

* * * * *